(12) United States Patent
Neilsen

(10) Patent No.: US 6,639,687 B1
(45) Date of Patent: Oct. 28, 2003

(54) PROGRESS INDICATOR FOR MULTIPLE ACTIONS

(75) Inventor: Robert Curt Neilsen, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/149,053

(22) Filed: Sep. 8, 1998

(51) Int. Cl.[7] .......................... G06F 15/00; G06K 1/00
(52) U.S. Cl. ............... 358/1.14; 358/1.1; 358/1.15; 358/1.13; 345/772; 345/771; 345/966; 709/100; 709/101
(58) Field of Search .......................... 358/1.1, 1.15, 358/1.14, 1.13; 345/772, 771, 966; 709/100, 101

(56) References Cited

U.S. PATENT DOCUMENTS

| | | | | |
|---|---|---|---|---|
| 5,621,878 A | * | 4/1997 | Owens et al. | 358/1.1 |
| 5,644,334 A | * | 7/1997 | Jones et al. | 345/157 |
| 5,706,411 A | * | 1/1998 | McCormick et al. | 358/1.1 |
| 5,745,659 A | * | 4/1998 | Rigau Rigau et al. | 358/1.1 |
| 5,919,248 A | * | 7/1999 | Kahkoska et al. | 709/224 |
| 5,953,010 A | * | 9/1999 | Kampe et al. | 345/772 |
| 5,987,535 A | * | 11/1999 | Knodt et al. | 358/1.1 |
| 6,038,588 A | * | 3/2000 | Nagarajayya et al. | 709/102 |
| 6,044,387 A | * | 3/2000 | Angiulo et al. | 707/10 |
| 6,266,150 B1 | * | 7/2001 | Brossman et al. | 358/1.12 |
| 6,275,299 B1 | * | 8/2001 | Beck | 358/1.15 |
| 6,288,790 B1 | * | 9/2001 | Yellepeddy et al. | 358/1.13 |
| 6,290,504 B1 | * | 9/2001 | Benitz et al. | 434/185 |
| 6,314,446 B1 | * | 11/2001 | Stiles | 709/100 |
| 6,337,745 B1 | * | 1/2002 | Aiello et al. | 358/1.1 |

FOREIGN PATENT DOCUMENTS

| | | | | |
|---|---|---|---|---|
| JP | 2000-032200 | * | 1/2000 | H04N/1/00 |
| JP | 2000-071578 | * | 3/2000 | B41J/29/42 |

OTHER PUBLICATIONS

Berkland, PT, DY Chang, and ST Li. "A Group Based Massive Node Server Status Monitor." Research Disclosure n345, 01–93.

Chang, DY and ST Li. "Matrix Format for Presenting the Status of a Group of Nodes." Technical Disclosure Bulletin v36 n5, 05–93, p297–298.

Chang, DY and ST Li. "Using Business Graphics for Presentation of a Group of Node Status." Research Disclosure n344, 12–92.

Dykstra, DJ and P Scannell. "Data Base Progress Indicator." Technical Disclosure Bulletin v37 n2A, 02–94, p341–342.

Johnson, WJ and OW Weber. "Method of Sharing an Intelligent Progress Bar Across Remote Machines." Technical Disclosure Bulletin v37 n3, 03–94, p427–428.

Shrader, TJ. "Node List Presentation in the LAN NetView Start Transformer Status Window." Technical Disclosure Bulletin v37 n2B, 02–94, p9–10.

* cited by examiner

*Primary Examiner*—Kimberly A. Williams
*Assistant Examiner*—Ashanti Ghee
(74) *Attorney, Agent, or Firm*—David W. Victor; Konrad Raynes Victor & Mann LLP

(57) ABSTRACT

Disclosed is a progress indicator generated on a computer display. Program logic in a computer system monitors the execution of a plurality of tasks, such as the transmission of print jobs, and determines progress status information for each of the executing tasks. The program logic may be used to select one of the executing tasks and display on a computer display a graphical representation of the progress status information of the selected executing task.

34 Claims, 11 Drawing Sheets

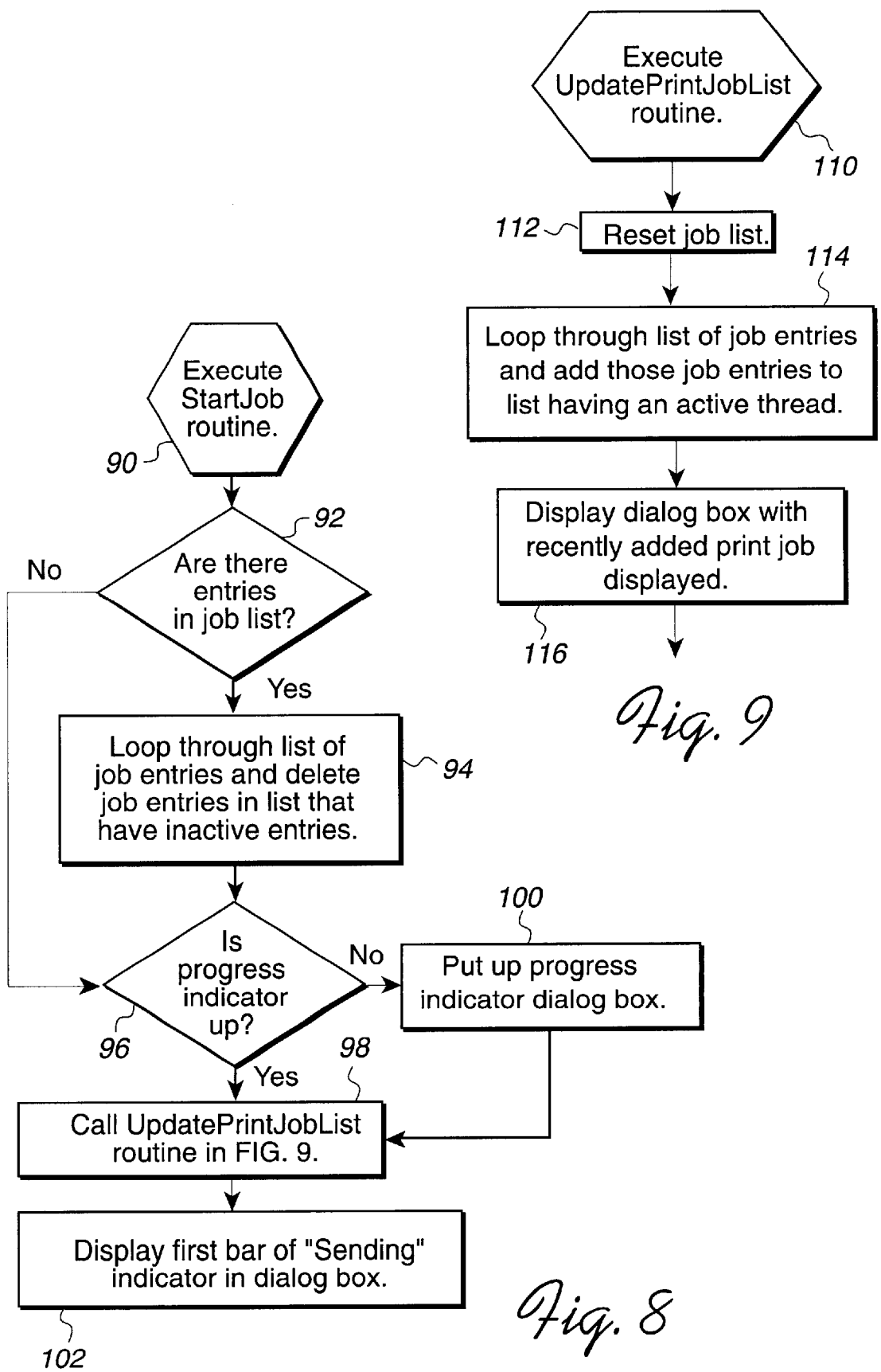

PROGRESS INDICATOR FOR MULTIPLE ACTIONS

BACKGROUND OF THE INVENTION

1. Field of the Invention

The present invention relates to a progress indicator providing status on the execution of multiple executing operations.

2. Description of the Related Art

Current application programs, such as printer-software and software that includes downloading or transmittal features such as Internet browser software and e-mail clients, often include a progress indicator dialog box. Such current progress indicators display the progress for a single transmittal operation. For instance, software that monitors the progress of a print job submitted to a printer often includes a progress indicator displayed at the computer to indicate the printing status of a single print job. Internet browser programs, such as the NETSCAPE® Communicator, often include a progress indicator indicating the status of a single download operation. NETSCAPE is a registered trademark of Netscape Communications Corporation.

However, such single status display indicators do not provide complete status information if there are numerous monitored tasks executing at once, such as numerous print jobs being transmitted to a printer server or printer for printing.

SUMMARY OF THE PREFERRED EMBODIMENTS

To overcome the limitations in the prior art described above, preferred embodiments disclose a progress indicator generated on a computer display. Program logic in a computer system monitors the execution of a plurality of tasks and determines progress status information for each of the executing tasks. The program logic may be used to select one of the executing tasks and display on a computer display a graphical representation of the progress status information of the selected executing task.

In further embodiments, the executing tasks have a discrete beginning and end. The progress status information indicates an amount of the task that has completed.

In yet further embodiments, the executing tasks are print jobs being transmitted to a printer server. In such case, the graphical representation of the progress status information indicates an amount of the selected print job that has completed.

In still further embodiments, progress status information is determined by maintaining an object for each executing task, wherein each object includes status information. Program logic updates the status information in the objects to indicate more recent status information on the executing tasks. Updated progress status information is then displayed in the graphical representation with the updated status information.

With preferred embodiments, a graphical representation is provided that may provide status information on instances of multiple tasks executing in the system. This is especially useful when the user or systems administrator wants to monitor multiple instances of a task executing, such as multiple submitted print jobs, multiple downloads of information, or any other multiple instances of a task that has a discrete beginning and end. Preferred embodiments provide a convenient graphical user interface to selectively access and display status information on multiple executing tasks.

BRIEF DESCRIPTION OF THE DRAWINGS

Referring now to the drawings in which like reference numbers represents corresponding parts throughout:

FIGS. 8 and 9 illustrate logic to update a list of active print jobs including status information thereon in accordance with preferred embodiments of the present invention;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
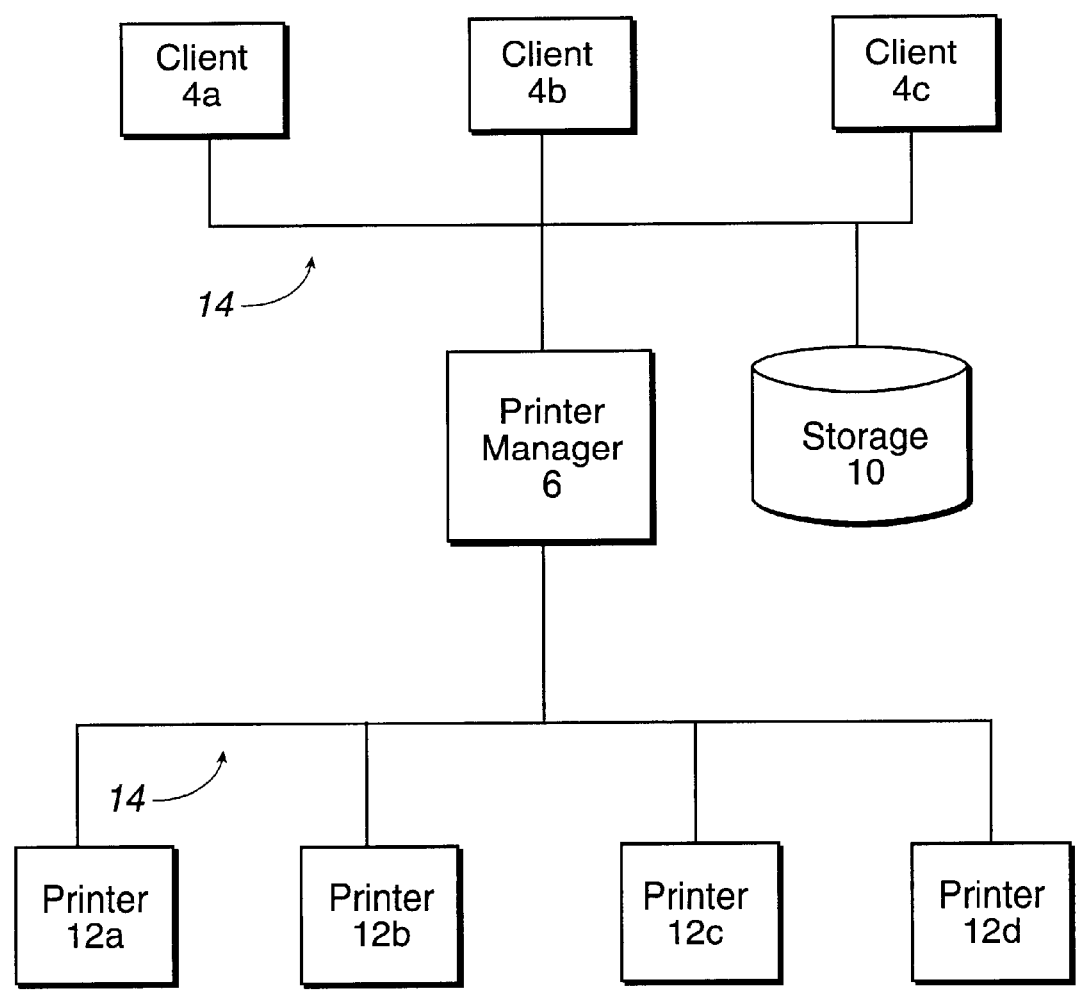
FIG. 1 is a block diagram illustrating a software and hardware environment in which preferred embodiments of the present invention are implemented.

FIG. 1 illustrates a hardware and software environment in which preferred embodiments of the present invention are implemented. A network printing system 2 is comprised of a plurality of client computers 4a, b, c connected to a printer manager 6, otherwise known as a server, which routes print jobs received from the clients 4a, b, c to one of a plurality of printers 12a, b, c, d. The printers 12a, b, c, d may be any suitable printer machine known in the art, such as the IBM INFOPRINT™ series of printers. INFOPRINT is a trademark of IBM. The printer manager 6 may be a separate stand alone server including an operating system such as AIX®, OS/390™, UNIX™, OS/2®, MVS™, WNDOWS®, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The clients 4a, b, c may be any computer system known in the art including software to submit print jobs to the printer manager 6.

The clients 4a, b, c may build print jobs that include print files, such as PostScript files, maintained in a network storage device 10. The storage device 10 may be any suitable non-volatile storage device, such as a direct access storage device (DASD), automated tape library (ATL), holographic units, etc., capable of storing print files. A network system 14 links the clients 4a, b, c to the printer manager 6 and storage device 10, and the printer manager 6 to the printers 12a, b, c, d. The network 14 may be comprised of any suitable network architecture known in the art, such as LAN, SNA, Ethernet, WAN, System Area Network (SAN), Token Ring, LocalTalk, TCP/IP, the Internet, etc. Alternatively, there may be separate and different networks between the clients 4a, b, c, the printer manager 6, and the printers 12a, b, c, d.

The printer manager 6 may route the print job to another computer, such as a printer controller, which transforms an input data file to a format that may be processed by the printer. A raster image process (RIP) is considered as the transform process of a PostScript file to a bit map file. The term RIP is used herein interchangeably with transform process to refer to any type of transform process regardless of the format of the file being transformed to a printer readable format, e.g., bitmap file. The terms RIP, RIPper, RIPped, and RIPping all refer to a particular stage or instance of a RIP transform process. As used herein the term "print job" refers to a print job that needs to be RIPped or otherwise transformed. Network printing systems are embodied in current IBM Multiple Printer Controller (MPC) and IBM PSF/6000 software products, described in IBM publications "PSF/6000: Print Submission," document no. S544-3878-01 (Copyright IBM Corp. 1993, 1994); "PSF/6000: Print Administration," document no. S544-3817-01 (Copyright IBM Corp. 1993, 1994); "IBM Print OnDemand User Guide," document no. G544-5325-00, (Copyright IBM Corp. 1996), all of which IBM publications are incorporated herein by reference in their entirety.

A print job is comprised of one or more electronically-stored files and the print attributes therefor. The print attributes inform the printer how to process the files. To assemble print jobs, previous systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user or systems operator.

Job tickets typically define print attributes for a print job comprised of one or more print files. A document comprised of multiple files may have more than one set of print attributes. A file submitted to the printer often includes printer instructions in a page description language (PDL) such as POSTSCRIPT®. POSTSCRIPT is a trademark of Adobe Systems, Incorporated. Print image files are in a bit-mapped image format. A RIP translates PDL files to a raster image or RIP version of the file. In the desktop publishing environment, it can take several hours to transform a large PDL print file to its RIP version.

The clients 4a, b, c include a network printer application program, such as the IBM InfoPrint Submit software, to build and submit print jobs, i.e., job tickets, to the printer manager 6, which queues the print job, i.e., spools the print job or job ticket. Once submitted, the printer manager 6 can RIP the print job itself or route the print job to another printer controller to RIP the component files of the print job. Once RIPped, the print job may be submitted to a printer 12a, b, c, d for printing.

The Progress Indicator Display

Figure 2:
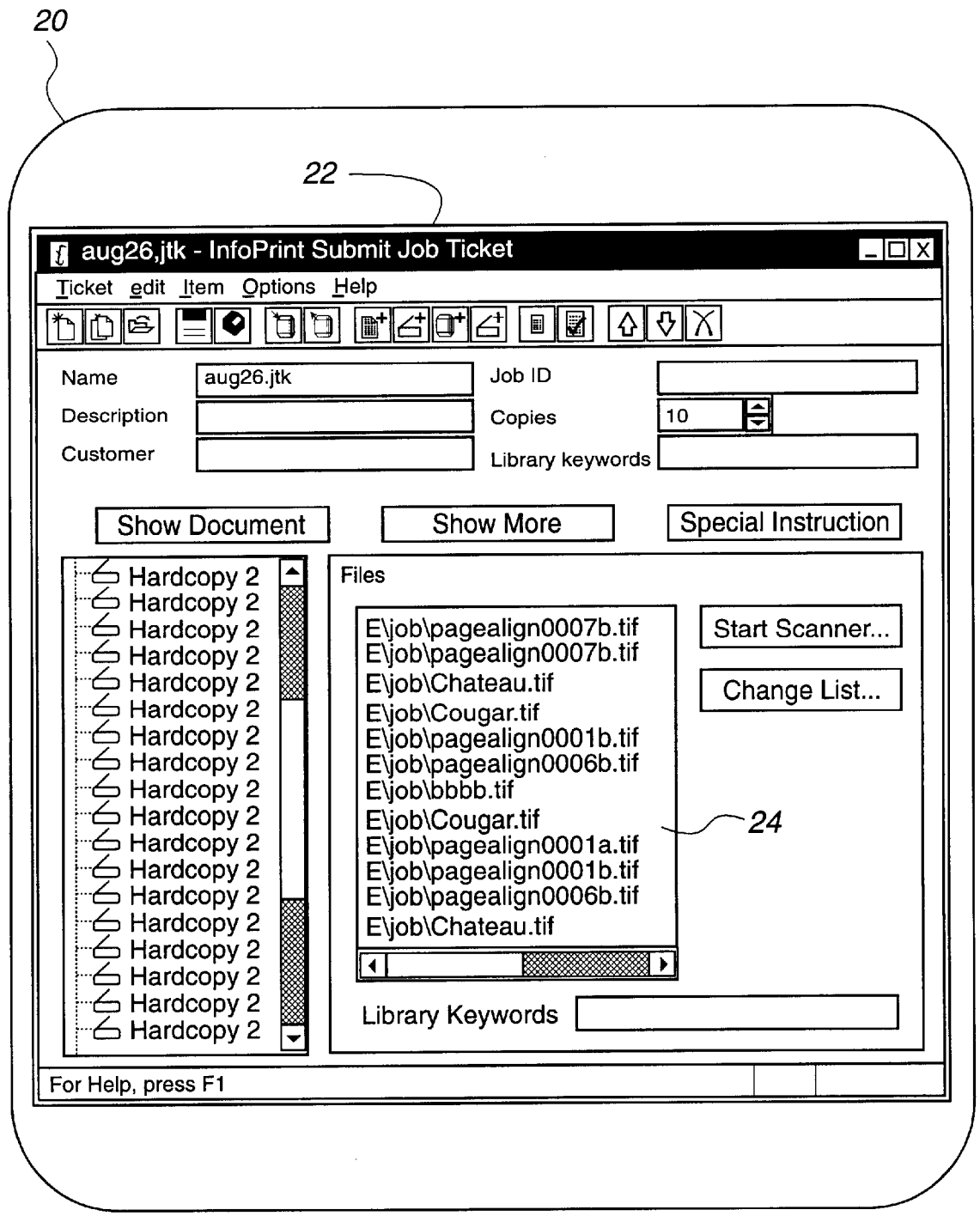
FIG. 2 illustrates a graphical user interface displaying job ticket information.

FIG. 2 illustrates a computer monitor 20 attached to one of the computers in the system 2, such as the clients 4a, b, c and/or printer manager 6. The monitor may be any known display device known in the art, including CRT, LCD, LED, touch-sensitive LCD, etc. Within the monitor 20 is displayed a detachable graphical window 22 showing the components of a job ticket "aug26.jtk." File window 24 displays the component files of the job ticket "aug26.jtk," which include various TIFF files.

Figure 3:
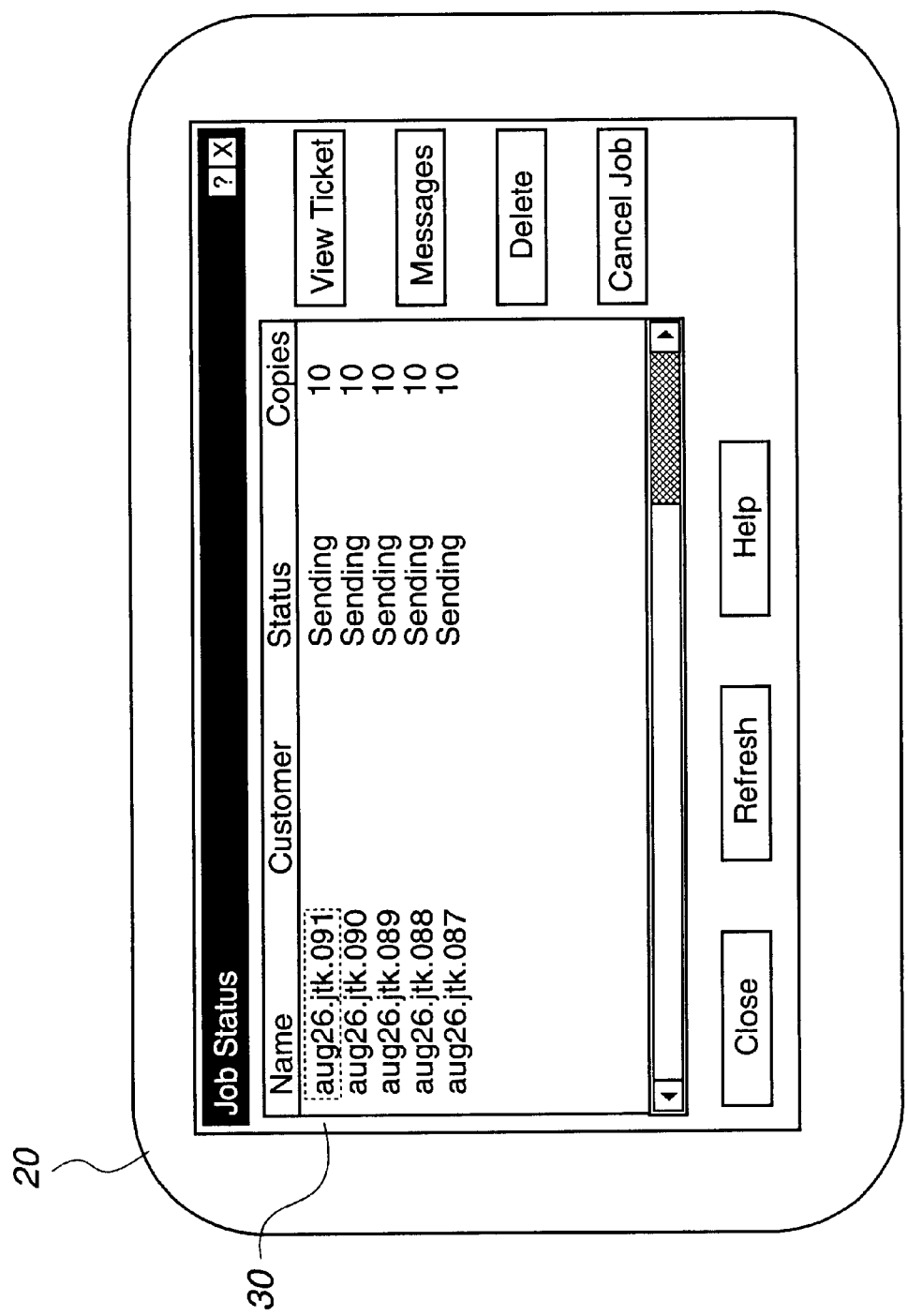
FIG. 3 illustrates a graphical user interface displaying information on multiple instances of submitted print jobs.

FIG. 3 illustrates a job status window 30 displayed in the monitor 20. The job status window 30 displays the name of different job tickets that are currently being submitted to the printer manager 6.

Figure 4A:
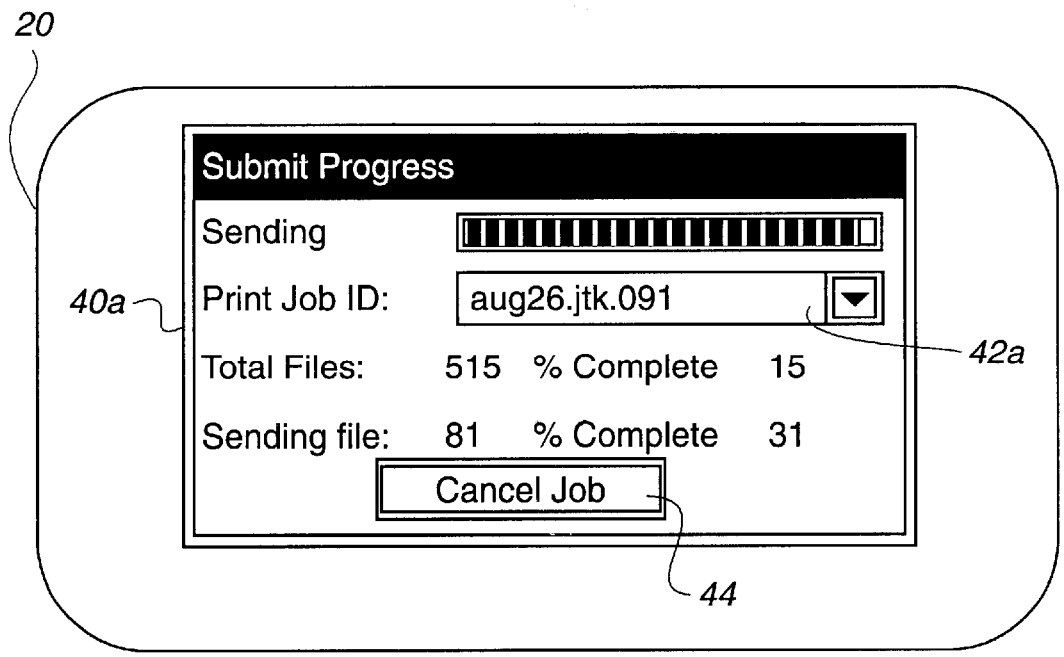
FIGS. 4a, b illustrate a graphical user interface displaying progress information on a submitted print job in accordance with preferred embodiments of the present invention.

FIGS. 4a, b illustrate different instances of the preferred progress indicator dialog box 40a, b that is capable of graphically illustrating and/or textually indicating the progress of one or more print jobs in the process of being submitted from the clients 4a, b, c to the printer manager 6. FIG. 4a illustrates the progress for a print job displayed in the "Print Job ID" field 42a, e.g., job ticket "aug26.jtk.091." As can be seen from the dialog box 40a, job ticket "aug26.jtk.091 " is comprised of 515 component files and 15% of this entire job has been submitted, i.e., is complete. Dialog box 40a further indicates the number of the current file being sent next to the "Sending file" line and the percent of the current file that has been transmitted to the printer manager 6, e.g., 31%. The dialog box 40a further displays a "Cancel Job" 44 button which a user may select to cancel the print job indicated in the PrintjobID field.

Figure 4B:
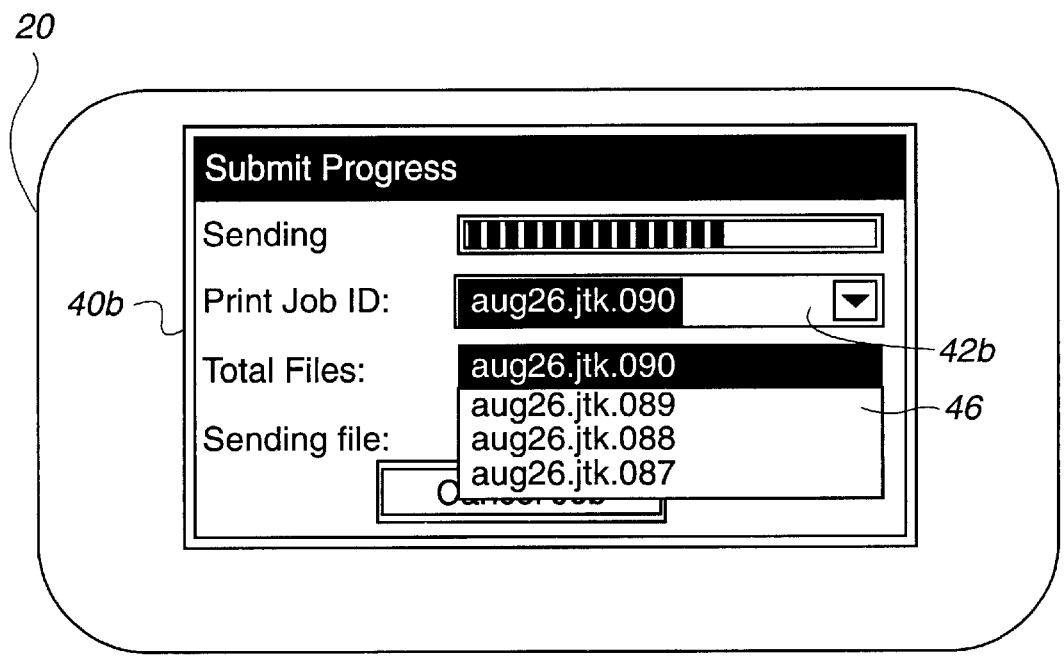

FIG. 4b displays the same dialog box displayed in FIG. 4a. FIG. 4b shows that the "Print Job ID" field 42b is implemented as a drop down list 46 including all the print job (job tickets) currently submitted. The user may select a print job displayed in the drop down list 46 as the "Print Job ID." The dialog box will then display the "Total files" and "Sending files" information for the selected print job.

In this way, preferred embodiments provide a graphical user interface mechanism for allowing users to monitor the progress of one of many print jobs being submitted to the spooler or printer manager 6.

Progress Indicator Data Structures

Figures 5, 6:
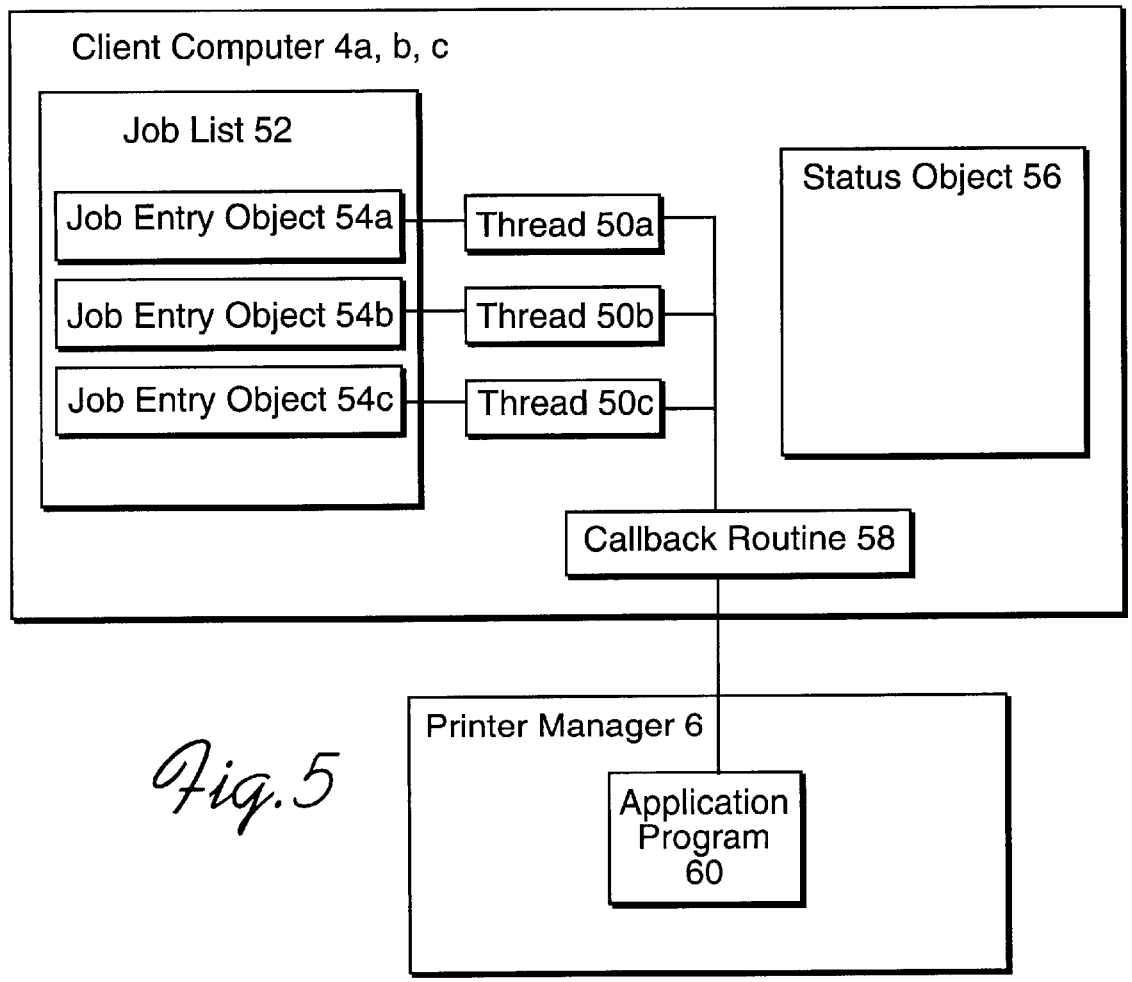
FIG. 5 illustrates an arrangement of program elements and objects to maintain status information on submitted tasks, such as print jobs, in accordance with preferred embodiments of the present invention.
FIG. 6 illustrates an object including fields used to provide status information on the progress of a submitted print job in accordance with preferred embodiments of the present invention.

FIG. 5 illustrates the relationship of the data structures and program objects used to maintain the information needed to generate the information displayed in the progress indicator dialog box 40a, b. When a print job, i.e., job ticket, is submitted from the client 4a, b, c to the printer manager 6, a thread 50a, b, c is activated in the client 4a, b, c. A thread is an encapsulation of the flow of control in a program, i.e., a process executing programs independently and separate from other processes. In preferred embodiments, the threads 50a, b, c are separate, independently executing, transmissions of a print job from a client 4a, b, c to the printer manager 6. A job list 52 object maintains a list of job entry 54a, b, c objects. The job entry objects 54a, b, c are added to the job list 52 when the thread 50a, b, c is activated. The job entry objects 54a, b, c include the status information needed to generate the progress indicator 40a, b display. A status object 56 maintains information on job entries, i.e., print jobs, after the print job is sent to the printer manager 6. The user may obtain information on print jobs after submission from the status object 56. In preferred embodiments, the job entry 54a, b, c and status object 56 data structures are maintained in the client computer 4a, b, c. These objects may also be maintained in the printer manager 6.

When a thread 50a, b, c is activated, the thread 50a, b, c provides the address of a callback routine 58. Whenever an event occurs, such as the thread being activated or a record submitted, the thread 50a, b, c submitting the data to the printer manager executes a callback routine 58. For instance, if thread 50a transmits a print job record to the printer manager 6 as part of the print job associated with thread 50a, then thread 50a will execute the callback routine 58. The callback routine 58 obtains information from the thread 50a, b, c concerning the status of the print job being submitted. The callback routine then updates the information maintained in the job entry object 54a, b, c with the new status information obtained from the thread 50a.

FIG. 6 illustrates a preferred embodiment of a job entry object 54a, b, c. The job entry object 54a, b, c includes the following variables: TotalPercent; CurrentPercent; CurrentFile; Total; FilesBeingSent; PrintJobID; GlobalJobId; JobStatus; pJob; ThreadActive; CancelJob; pStatus; pDB. "TotalPercent" indicates the percent of all files in the entire print job that have been transmitted to the printer manager 6, including all component files of the print job. This variable is used to determine the "% Complete" for the entire print job displayed in the progress indicator dialog box 40a. The TotalPercent may be calculated as a percent of the number of files transmitted. In alternative embodiments, the TotalPercent may indicate the percentage of all bytes in the print job, across all files, that have been transmitted. The total number of bytes in all print jobs may be determined by scanning all files in the print job to calculate the TotalPercent as a percentage of all bytes included in the files of the print job that have been transmitted. However, in preferred embodiments, to improve performance time and avoid having to scan all files to determine the total number of bytes in all files in the print job, the TotalPercent is calculated as a percentage of files that have been transmitted, not a percentage of the total number of bytes for all files in the print job;

"CurrentPercent" indicates the percent, e.g., percent of buffers, of the current component file of the print job that has been transmitted. This variable is used to determine the "% Complete" of the current file being sent displayed in the progress indicator dialog box 40a.

"CurrentFile" indicates the number of the current file in the print job being transmitted. "Total" indicates the total number of buffers transmitted for the current file being transmitted. The Total value is used to determine the "CurrentPercent," which is the current number of buffers or records that have been transmitted divided by the "Total" value. The thread would maintain a counter indicating the number of buffers transferred for the current file, and divide this value by the "Total" variable to obtain the "% Complete" for the "Sending file."

"FilesBeingSent" indicates the number of files being sent in the print job. In the dialog box 40a shown in FIG. 4b, the FilesBeingSent is used to display the "Total files" which is 515. The "% Complete" for Total files can be calculated from the (CurrentFile−1)/(FilesBeingSent), e.g., 80/515≈15%; "PrintJobID" indicates the job ticket name and a submission number for the print job. For instance, a user may submit multiple copies of a job ticket. In such case, the PrintJobID indicates the name of the job ticket and the submission number of the submitted job ticket if there are multiple submissions of the same job ticket. For instance, in the drop down box 46 in FIG. 4b, there are multiple instances of job ticket "aug26.jtk" submitted as indicated by the number indicating the number of the submission, e.g., 090, 089, 088, etc.

"GlobalJobID" indicates the job ticket to the server. When the client computer 4a, b, c wants to obtain information on the status of a print job after it is transmitted to the printer manager 6, the client computer 4a, b, c would use the GlobalJobId to obtain such information.

"Copies" indicates the number of copies of the print job that has been sent.

"JobStatus" indicates the current status of the job being sent, e.g., sending, completed, RIPping, printing. Note, that the JobStatus may indicate activities beyond the sending activities. For instance, the client 4a, b, c may query the printer manager 6 about the print job after it has been sent to the printer manager 6 to determine further status, such as RIPping, printing, completed, etc. Thus, in preferred embodiments, JobStatus spans the actual submission and thread 50a, b, c after creation all the way to processing by the printer manager 6 and other devices. The user at a client 4a, b, c may query the print job to determine the status at the printer manager 6. When first submitting, status is sending. After sent, the client 4a, b, c queries the printer manager 6 to determine subsequent status such as RiPping or printing. Certain of the variables, such as TotalPercent, CurrentPercent, Total, FilesBeingSent, etc., are only applicable while the print job is being sent from the client 4a, b, c to the printer manager 6. Other variables, such as GlobalJobID, JobStatus, and PrintjobID are applicable at all stages of the print job, including after the print job is entirely submitted to the printer manager 6.

The "CancelJob" field indicates whether a request to cancel the submission of the print job has been made. For instance, depressing the Cancel Job button on the progress indicator 40a can cancel the job and set the variable CancelJob to "on."

The "ThreadActive" variable indicates whether the thread is active, i.e., whether the print job is being transferred to the printer manager 6. "pJob" is a pointer to the job ticket object, including information indicating the component files and print attributes of the print job. In this way, the job entry 54a, b, c does not have to include actual data, but may include pointers to data located in other objects. "pStatus" is a pointer to the status object 56. Information can be passed from job entry objects 54a, b, c in the job list 52 to the status object 56 using the pStatus pointer. "pDB" is a pointer to the progress indicator dialog box 40a, b. The dialog box 40a, b pulls information for display from the job entries 54a, b, c in the job list 52. The "pDB" is used to access the dialog box from processing the job entry 54a, b, c.

Managing the Progress Indicator Dialog Box

Figure 7:
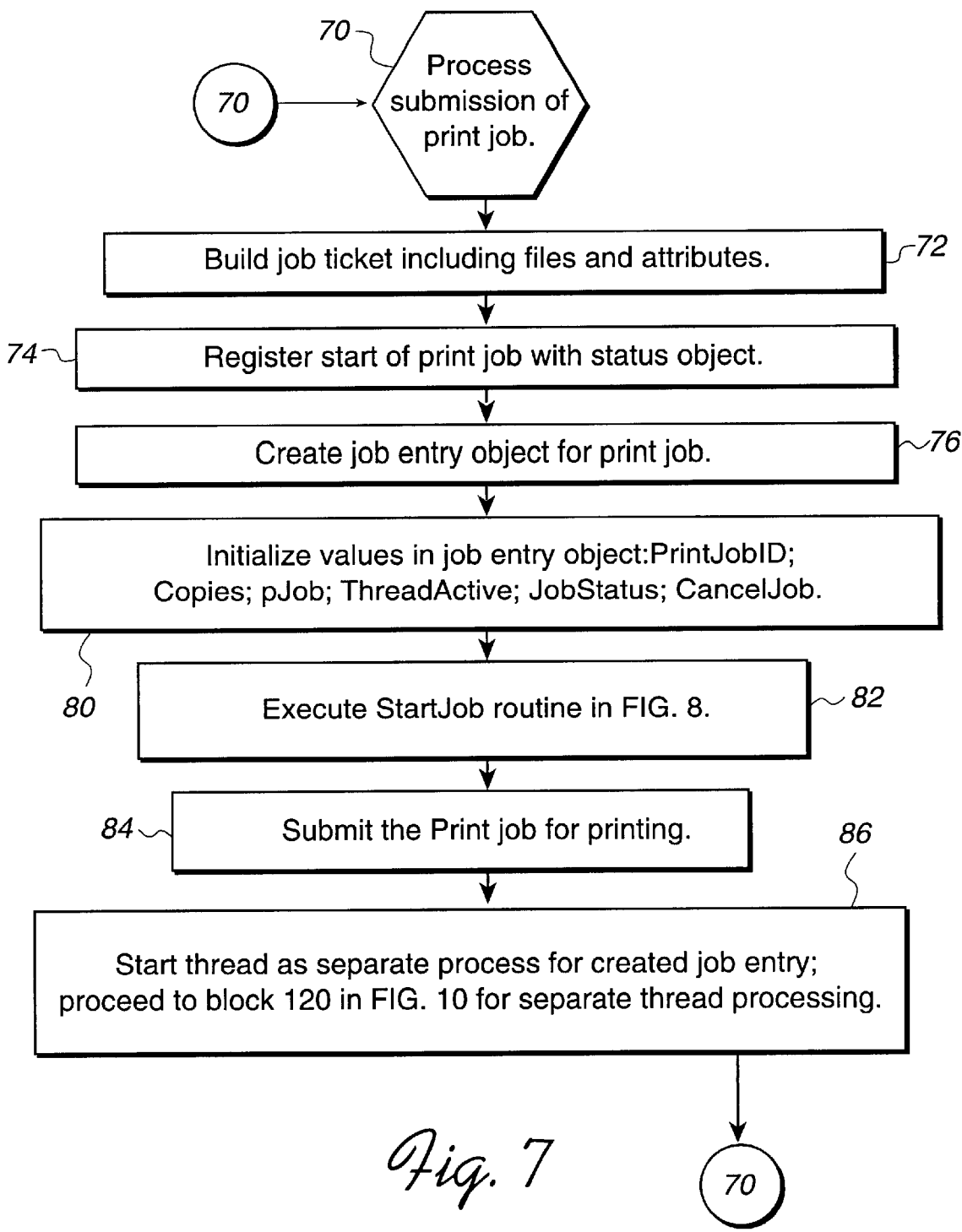
FIG. 7 illustrates logic to submit a print job and maintain status information thereon in accordance with preferred embodiments of the present invention.

FIGS. 7–14 illustrate software logic implemented within a printer application program executing in the client computer 4a, b, c and printer manager 6 (server) to generate the information needed to maintain the progress indicator dialog box 40a, b. FIG. 7 illustrates logic to process the submission of a job ticket from a client computer 4a, b, c. Control begins at block 70 which represents the client computer 4a, b, c processing a submission of a print job. Control transfers to block 72 which represents the client 4a, b, c building a job ticket including the component files and print attributes. Control transfers to block 74 which represents the client 4a, b, c registering the start of the submission of the print job with the status object 56. Control transfers to block 76 which represents the client 4a, b, c creating a job entry object, e.g., job entry object 54a, for the print job.

Figure 10:
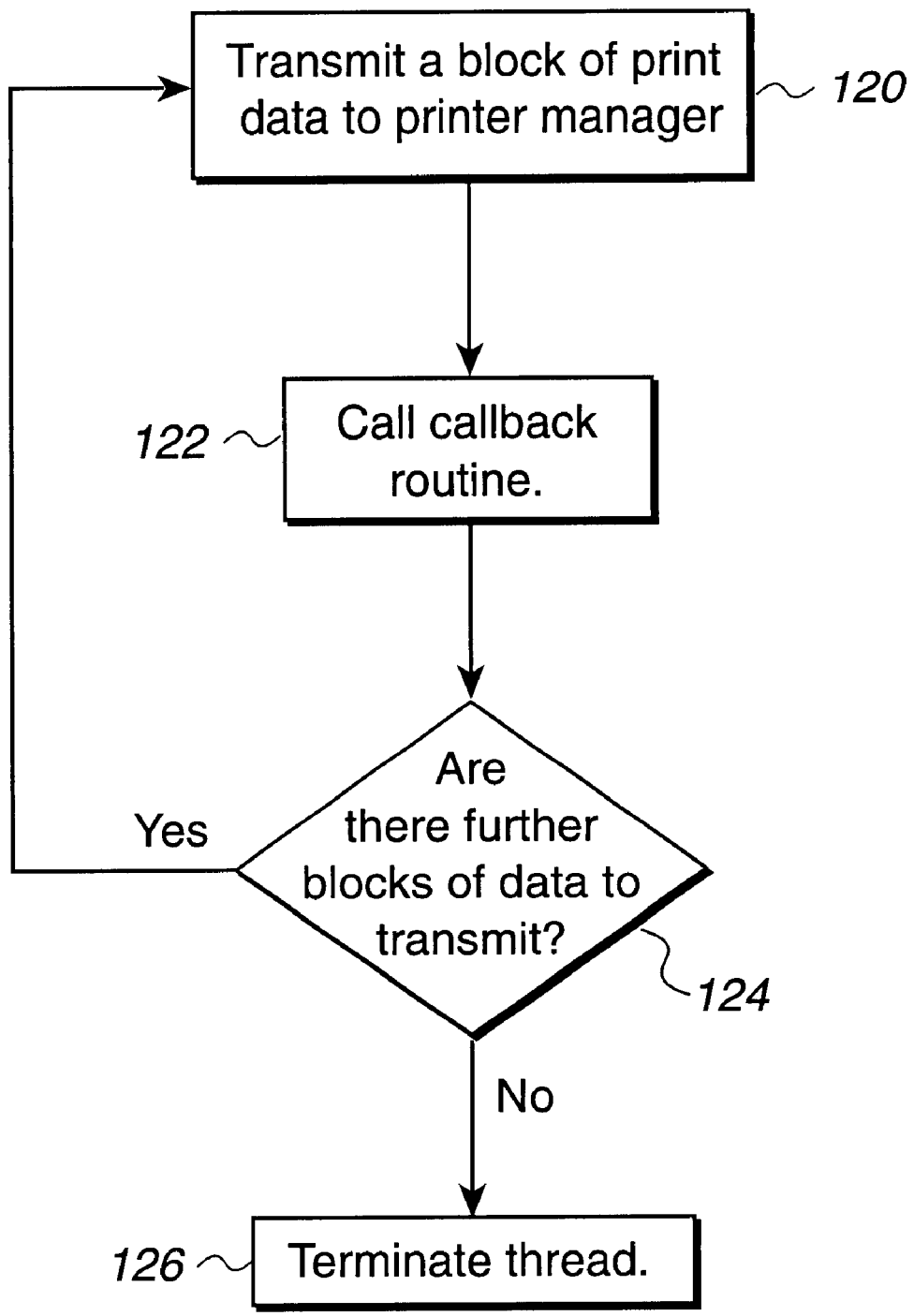
FIG. 10 illustrates the flow of control of a thread executing to submit a print job to the printer manager in accordance with preferred embodiments of the present invention.

Control then transfers to block 80 which represents the client 4a, b, c initializing values in the added job entry object 54a, including: the PrintJobID; the number of copies of the print job submitted—Copies, setting the pointer to the job entry object 54a—pjob; setting ThreadActive to "on"; indicating the JobStatus as sending; and setting CancelJob to "off." Control transfers to block 82 which represents the client 4a, b, c executing the StartJob routine illustrated in FIG. 8 to add the created job entry object 54a to the job list 52. Control transfers to block 84 which represents the client 4a, b, c submitting the print job, including component files, to the printer manager 6 for printing. Control then transfers to block 86 to start the thread for submitting the print job to the printer manager 6 as a separate process. Once the thread is initiated, the logic of FIG. 10 illustrates the thread executing as an independent process to submit the print job to the printer manager 6. Control then returns to the print submission software to allow the user to submit further print jobs at block 70.

FIG. 8 illustrates the logic of the StartJob routine called to add a new job entry object 54a, b, c to the job list 52. Control begins at block 90 which represents the execution of the StartJob routine. Control transfers to block 92 which represents the client 4a, b, c determining whether there are any entries in the job list 52. If so, control transfers to block 94 which represents the client 4a, b, c looping through the job entry objects 54a, b, c in the job list and deleting those job entries 54a, b, c in the list that have inactive threads, i.e., the ThreadActive variable is "off." From the no branch of block 92 or block 94, control transfers to block 96 which represents the client 4a, b, c determining whether the progress indicator 40a, b is up and displayed. If so, control transfers to block 98; otherwise, control transfers to block 100 which represents the client 4a, b, c putting up the progress indicator dialog box 40a, b. At block 98, the client 4a, b, c executes the UpdatePrintJobList routine illustrated in FIG. 9 to add the new entry to the job list 52 and update the job list 52. After updating the print job list 52, the progress indicator 40a, b displays the recently submitted print job. Control then transfers to block 102 which represents the client 4a, b, c setting the progress indicator bar labeled "Sending" in FIGS. 4a, b to display the first bar. The "Sending" indicator graphically represents the percentage of the print job that has been transmitted to the printer manager 6.

FIG. 9 illustrates the UpdatePrintJobList routine used to update the job list 52. Control begins at block 110 which represents the client 4a, b, c executing the UpdatePrintJobList routine. Control transfers to block 112 which represents the client 4a, b, c resetting the job list 52. Control then transfers to block 114 where the client 4a, b, c loops through the job entry objects 54a, b, c in the job list 52 and adds those job entry objects 54a, b, c to the job list 52 that have active threads, i.e., the ThreadActive variable is "on." Control then transfers to block 116 where the client 4a, b, c displays the dialog box 40a, b, c with the first print job in the list displayed. In preferred embodiments, the job entry object 54a newly added to the list is displayed in the progress indicator 40a, b until the user selects another print job from the drop down box 46.

FIG. 10 illustrates the execution of a thread 50a, b, c to transmit a print job to the printer manager 6. Execution of the thread begins at block 120 which represents the transmission of a block or other unit of data of the print job to the printer manager 6. Data from the print job may be transmitted from the client 4a, b, c or from some other location, e.g., storage 10, to the printer manager 6. Component files of a print job may be distributed throughout the network printing system 2. Control transfers to block 122 which represents the thread 50a, b, c executing the callback routine 58 to update the job entry 54a, b, c object with new status information to reflect the transmittal of the last block of print job data. Control then transfers to block 124 which represents the thread 50a, b, c determining whether there are further blocks of print job data to transmit. If so, control transfers back to block 120 to transmit the next block of print job data. Otherwise, control transfers to block 126 to end the thread 50a, b, c as the print job has been transmitted.

Figure 11:
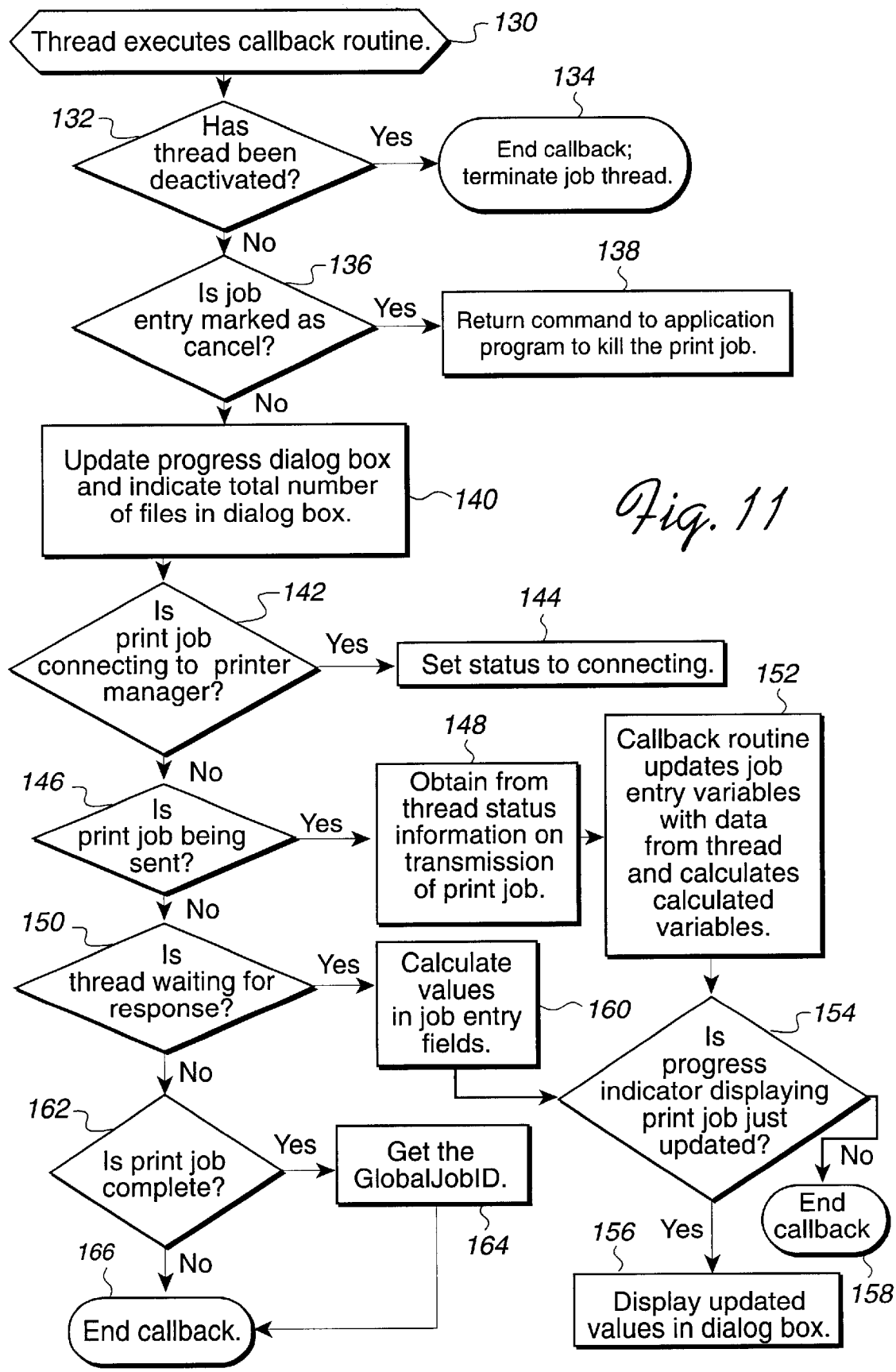
FIG. 11 illustrates logic to obtain updated status information on a submitted print job in accordance with preferred embodiments of the present invention.

FIG. 11 illustrates the logic of the callback routine 58 which the thread 50a, b, c calls to update information in the job entry object 54a, b, c for the thread 50a, b, c executing the callback routine 58. Control begins at block 130 which represents the client 4a, b, c executing the callback routine 58 from a thread, e.g., thread 50a. Control transfers to block 132 which represents the client 4a, b, c, or executing thread 50a, determining whether the executing thread 50a has been deactivated. If so, control transfers to block 134 to end the callback routine and terminate the thread 50a, b, c process. Otherwise, control transfers to block 136 which represents the client 4a, b, c determining whether the job entry object 54a for the activating thread 50a is indicated as canceled, i.e., the CancelJob variable is "on." If the job entry object 54a is marked as canceled, then control transfers to block 138 to send a command to the application program 60 in the printer manager 6 to terminate the print job. If the print job is not indicated as canceled, then control transfers to block 140 which represents the client 4a, b, c, i.e., thread, updating the progress indicator dialog box 40a, b to indicate the total number of files for the print job of the activating thread 50a that have been transmitted to the printer manager 6. Control then transfers to block 142 to determine whether the print job is connecting to the printer manager 6. If so, control transfers to block 144 where the JobStatus variable in the job entry object 54a is set to connecting. Otherwise, at block 146, the callback routine 58 determines whether the print job for the activating thread 50a is being sent to the printer manager 6. If so, control transfers to block 148; otherwise, control transfers to block 150.

Block 148 represents the callback routine 58 obtaining from the thread 50a, b, c, which called the callback routine 58, current status information on the transmission of the print job. The thread 50a, b, c maintains current information on job status, i.e., the amount of data sent, because the thread 50a, b, c transmits data from the print job to the printer manager 6. Further, the thread 50a, b, c may also obtain status information from communicating with or querying the printer manager 6. Control then transfers to block 152 where the callback routine 58 updates job entry object 54a variables, such as CurrentFile, Total, FilesBeingSent, etc. With this information, the callback routine 58 calculates other job entry object 54a variables such as TotalPercent, CurrentPercent, etc, that are used to generate the information in the progress indicator dialog box 40a, b and updates the calculated job entry 54a variables with the new information. Control then transfers to block 154 which represents the client 4a, b, c determining whether the progress indicator dialog box 40a, b is displaying the print job for the job entry 54a just updated. If so, control transfers to block 156 to generate the display in the progress indicator 40a, b of the updated information; otherwise, control transfers to block 158 to end the callback routine.

If the print job is not being sent, then control transfers to block 150 which represents the client 4a, b, c determining whether the thread 50a is waiting for a response from the printer manager 6. If so, control transfers to block 160 where the client 4a, b, c calculates certain job entry 54a variables, such as TotalPercent, CurrentPercent, etc. Control then proceeds to block 154 et seq. to update the progress indicator 40a, b if necessary. If the activating thread 50a is not waiting for a response from the printer manager 6, then control transfers to block 162 which represents the client 4a, b, c determining whether the transmission of the print job is complete. If so, control transfers to block 164 which represents the callback routine obtaining the GlobalJobID and updating this field in the job entry object 54a. The client 4a, b, c may use the GlobalJobID to determine the status of the print job after it is transmitted to the printer manager 6, such as during RiPping, printing, etc. Otherwise, from the no branch of block 162 or block 164, control transfers to block 166 to end the callback routine 58.

The callback routine may be called at other instances to update the information in the job entry objects 54a, b, c. In preferred embodiments, every time a record is transferred to the printer manager 6 for a particular print job, the thread for such print job executes the callback routine 58. The callback routine 58 obtains updated information from the printer manager 6 on the status of the print job transmission and updates the job entry object 54a, b, c for the thread 50a, b, c executing the callback routine 58.

Figures 12, 13:
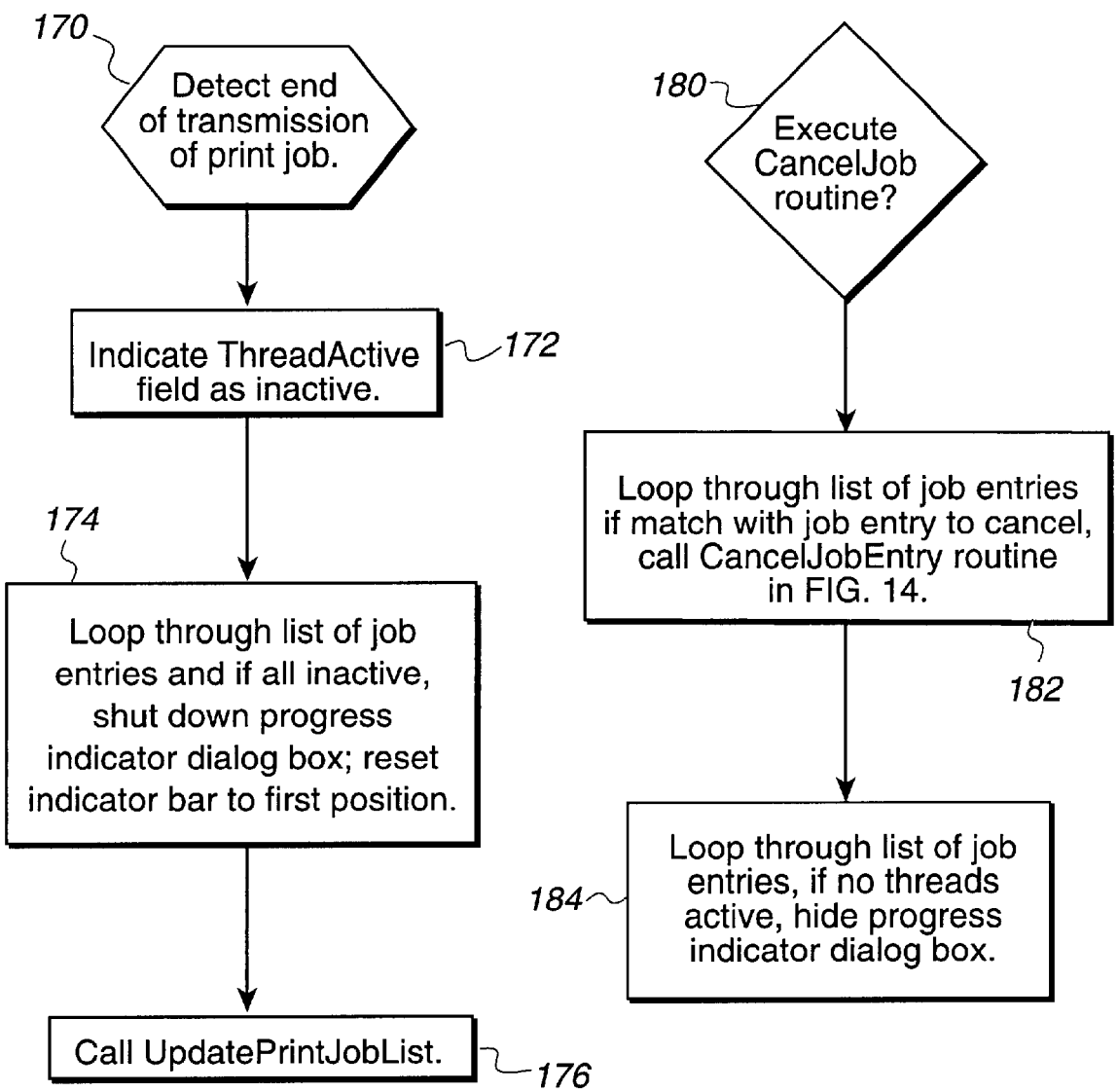
FIG. 12 illustrates logic to end the transmission of a print job in accordance with preferred embodiments of the present invention.
FIGS. 13 and 14 illustrate logic to cancel a print job in accordance with preferred embodiments of the present invention.

FIG. 12 illustrates logic for handling the completion of the transmission of a print job, i.e., job ticket, to the printer manager 6. Control begins at block 170 which represents the client 4a, b, c detecting the end of the transmission of the print job to the printer manager 6. Control transfers to block 172 which represents the client 4a, b, c setting the ThreadActive as "off," i.e., the thread 50a, b, c is not active. Control transfers to block 174 which represents the client 4a, b, c looping through the list of job entries 50a, b, c. If the threads 50a, b, c for the job entries 54a, b, c are inactive, then the client 4a, b, c removes the display of the progress indicator 40a, b and resets the sending bar to the first position. Control then transfers to block 176 to execute the UpdatePrintJobList routine in FIG. 9.

FIG. 13 illustrates logic executed when the user selects to close a print job, such as selecting the "Cancel Job" button in the progress indicator 40a, b. Control begins at block 180 which represents the client 4a, b, c processing a request to cancel the print job, i.e., execute the CancelJob routine. Control transfers to block 182 which represents the client 4a, b, c looping through the job list 52 to determine whether any of the listed job entry objects 54a, b, c match the print job the user selected to cancel. Upon locating a match, the CancelJob routine calls the CancelJobEntry routine in FIG. 14 to terminate the thread at the printer manager 6. In this way, the print job is canceled at both the client 4a, b, c and printer manager 6 (server) ends. Control transfers to block 184 which represents the CancelJob routine looping through the list of job entries searching for an active thread, i.e., ThreadActive variable set "on." If no active thread is located, the progress indicator 40a, b is removed from the display.

Figure 14:
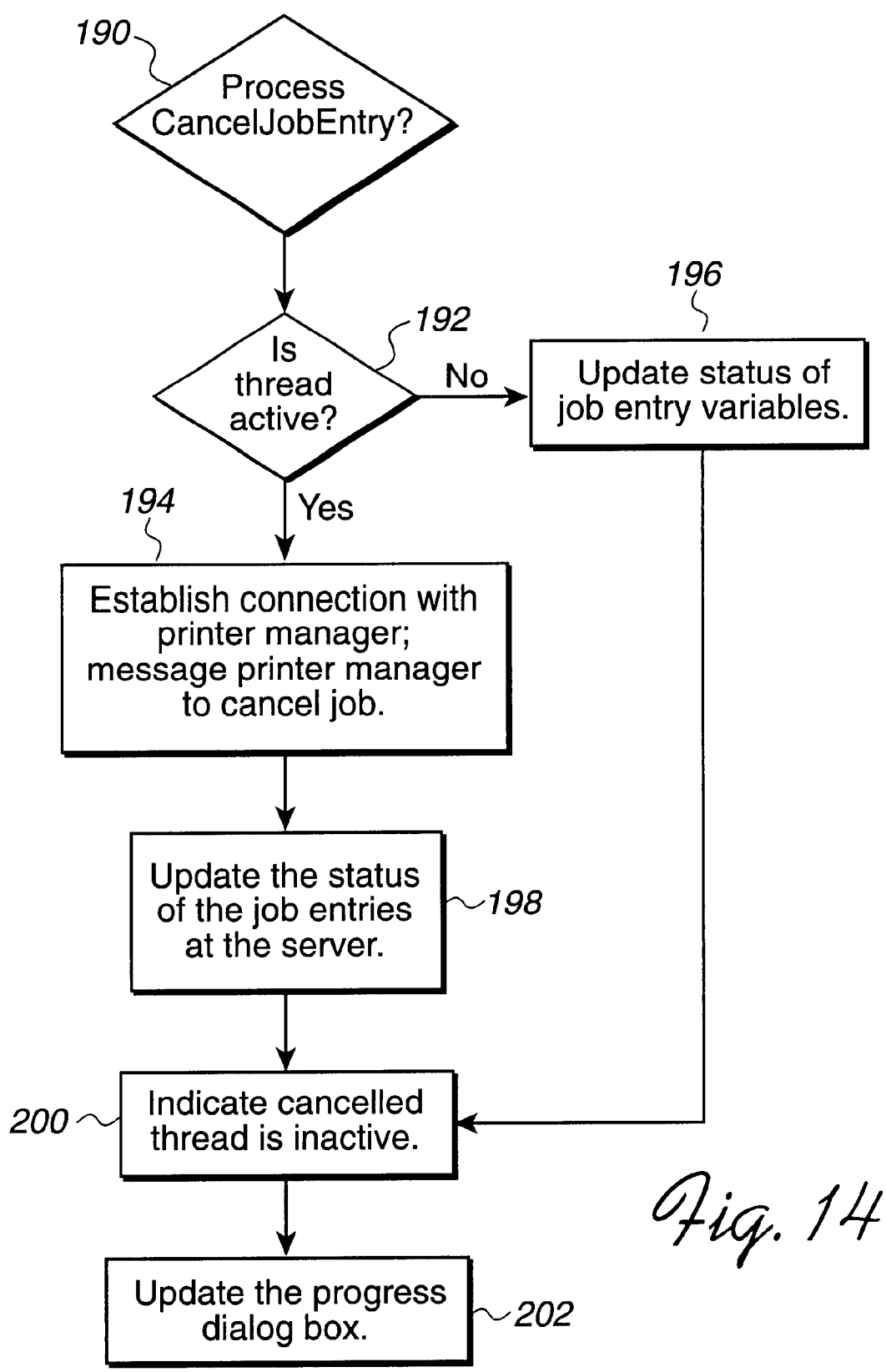

FIG. 14 illustrates the logic of the CancelJobEntry routine called in the CancelJob routine. Control begins at block 190 which represents the execution of the CancelJobEntry. routine. Control transfers to block 192 which represents the client 4a, b, c, operating under control of the CancelJobEntry routine, determining whether the thread for the job entry to be canceled (e.g., job entry 54a) is active by determining whether the ThreadActive variable is "on." If so, control transfers to block 194; otherwise, control transfers to block 196 to update various job entry 54a variables and update the JobStatus as completed. Block 194 represents the CancelJobEntry sending a message to the printer manager 6 to cancel the thread and print job. Control transfers to block 198 which represents the printer manager 6 (printer server) canceling the print job and job entry within the printer manager 6 so the printer manager 6 handles the print-job as canceled. From block 196 or 198, control transfers to block 200 to indicate that the thread is inactive, i.e., ThreadActive is "off." Control then transfers to block 202 to update the progress indicator dialog box 40a, b to remove the indication of the canceled job entry 54a.

In preferred embodiments, after a job is canceled with the CancelJob routine, the job entry remains in the job list 54a even though the transmission of the print job associated with the job entry 54a is canceled. In this way, information on the status of the canceled job entry 54a can still be obtained.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographicunit, etc. Of course, those skilled in the art will recognize many modifications may be made to this configuration without departing from the scope of the present invention.

In preferred embodiments, the progress indicator displays the percent of all files that have been transmitted on a file basis and the percentage of the current file that has been transmitted. In alternative embodiments, different percentages may be displayed, such as the percentage in bytes of files that have been transferred. To determine. the total bytes in. all files to calculate such a percentage, all the files in the print job would have to be scanned. This determined total byte value for all files in the print job would then be provided to the job entry object to maintain and use in determining status information to be displayed in the progress indicator.

The preferred progress indicator only displays the progress of one task executing at a time even though information is maintained for multiple tasks executing. In further embodiments, the progress indicator dialog box may selectively display status information for multiple executing tasks.

The logic of FIGS. 7–14 is for illustrative purposes. Additional or alternative steps may be performed in addition to those illustrated in the logic. Further, the order of the steps in the preferred logic may also vary. The preferred logic of FIGS. 7–14 may be implemented in an object oriented programming language such as JAVA™, Smalltalk, and C++. JAVA is a trademark of Sun Microsystems, Inc. However, other programming languages may also be used to implement the logic of FIGS. 7–14 in an application program incorporated within a printer program.

Preferred embodiments were described with respect to monitoring the progress of the transmission of print jobs from a client computer to a printer server, e.g., the printer manager 6. In alternative embodiments, the preferred progress indicator embodiments may be used to monitor other types of multiple, concurrently executing printer tasks, such as RIPping or printing. In yet further embodiments, the preferred progress indicator embodiments may be used to monitor and provide status information on multiple threads or processes performing any type of operation in any type of environment, including multiple downloading, data transmission activities or other multi-tasking activities in non-printer settings.

In preferred embodiments, the tasks being monitored for display in the progress indicator are of the same class of operations, e.g., print jobs. In further embodiments, the progress indicator may monitor different types of computer operations.

Preferred embodiments were described as implementing the progress indicator in a dialog box. However, in alternative embodiments, the progress indicator could be implemented in any type of window visual interface or any other type of visual depiction means and interface known in the art.

In summary, preferred embodiments in accordance with the present invention provide a progress indicator generated on a computer display. Program logic in a computer system monitors the execution of a plurality of tasks and determines progress status information for each of the executing tasks. The program logic may be used to select one of the executing tasks and display on a computer display a graphical representation of the progress status information of the selected executing task.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for displaying a progress indicator on a computer display, comprising the steps of:
   monitoring execution of a plurality of tasks in a computer system;
   determining progress status information for each of the executing tasks;
   receiving user selection of one of the executing tasks; and
   displaying on a computer display a graphical representation of the progress status information of the selected executing task.

2. The method of claim 1, wherein the executing tasks have a discrete beginning and end, and wherein the progress status information indicates an amount of the task that has completed.

3. The method of claim 1, wherein the executing tasks are of the same class of tasks.

4. The method of claim 1, wherein the executing tasks are print jobs being transmitted to a printer server and wherein the graphical representation of the progress status information indicates an amount of the selected print job that has completed.

5. The method of claim 1, wherein the graphical representation is a dialog box and wherein the step of selecting one of the executing tasks comprises selecting the executing task from a list displayed from the dialog box.

6. The method of claim 1, wherein the step of determining progress status information comprises the steps of:
   maintaining an object for each executing task, wherein each object includes status information;
   updating status information in the objects to indicate more recent status information on the executing tasks; and
   updating progress status information displayed in the graphical representation with the updated status information.

7. The method of claim 6, wherein each executing task comprises an executing thread, wherein the step of updating status information comprises the steps of:
   executing, from each thread executing one task, a callback routine to communicate with an application program;
   determining, with the callback routine, updated status information for the task associated with the thread executing the callback routine; and
   updating the object associated with the thread executing the callback routine with the updated status information.

8. A method for displaying a progress indicator on a computer display, comprising the steps of:
   (a) monitoring execution of a plurality of tasks in a computer system, wherein each executing task comprises an executing thread;
   determining progress status information for each of the executing tasks by:
      (i) maintaining an object for each executing task, wherein each object includes status information;
      (ii) updating status information in the objects to indicate more recent status information on the executing tasks by:
         (A) executing, from each thread executing one task, a callback routine to communicate with an application program;
         (B) determining, with the callback routine, updated status information for the task associated with the thread executing the callback routine; and
         (C) updating the object associated with the thread executing the callback routine with the updated status information;
      (iii) updating progress status information displayed in the graphical representation with the updated status information;
   (b) selecting one of the executing tasks;
   (c) displaying on a computer display a graphical representation of the progress status information of the selected executing task;
   (d) maintaining a list of objects for executing threads, wherein each object includes a value indicating whether the thread corresponding to the object is active;
   (e) processing the list of objects and the value in the objects indicating whether the thread is inactive to determine objects associated with inactive tasks; and (f) deleting from the list of objects those determined objects associated with inactive tasks.

9. The method of claim 7, wherein a thread is an instance of a print job being transmitted to a printer server, wherein the application program is executing in the printer server, and wherein the thread executes the callback routine in a client computer in communication with the printer server.

10. The method of claim 9, wherein the print jobs are comprised of at least one component print file, wherein the status information in each object includes a current file value indicating the current file being transmitted to the printer server, a total file value indicating all the files in the print job, and a file size value indicating a size of the current file being transmitted, further comprising the step of calculating a total percent of print files in the print job transmitted to the printer server and the percent transmitted of the current file being transmitted, and wherein the step of displaying progress status information comprises displaying at least one status information indicia that is a member of the set of status information indicia comprising: a total number of files in the print job; a percent of all files in the print job that have been transmitted; a number of the file being sent; and a percent of the file being sent that has been transmitted.

11. The method of claim 10, wherein the step of displaying the percent of all files in the print job that have been transmitted comprises displaying the percent as a total percent of bytes across all files that have been transmitted.

12. A system for displaying a progress indicator, comprising:
   a computer system;
   a display linked to the computer system;
   program logic means executed in the computer system, including:
      (i) means for monitoring execution of a plurality of tasks in a computer system;
      (ii) means for determining progress status information for each of the executing tasks;
      (iii) means for receiving user selection of one of the executing tasks; and
      (iv) means for displaying on a computer terminal a graphical representation of the progress status information of the selected executing task.

13. The method of claim 12, wherein the executing tasks have a discrete beginning and end, and wherein the progress status information indicates an amount of the task that has completed.

14. The system of claim 12, further comprising a printer server, wherein the executing tasks are print jobs being transmitted to the printer server and wherein the displayed graphical representation of the progress status information indicates an amount of the selected print job that has completed.

15. The system of claim 12, wherein the graphical representation is a dialog box and wherein the program logic means further comprises means for selecting one of the executing tasks from a list displayed from the dialog box.

16. The system of claim 12, wherein the program logic means further comprises:
   means for maintaining an object for each executing task, wherein each object includes status information;
   means for updating status information in the objects to indicate more recent status information on the executing tasks; and
   means for updating progress status information displayed in the graphical representation with the updated status information.

17. The system of claim 16, wherein each executing task comprises an executing thread, wherein the program logic means further comprises:
   means for executing, from each thread executing one task, a callback routine to communicate with an application program;
   means for determining updated status information for the tasks associated with the thread executing the callback routine; and
   means for updating the object associated with the thread executing the callback routine with the updated status information.

18. A system for displaying a progress indicator, comprising:
   a computer system;
   a display linked to the computer system;
   a printer server in communication with the computer system;
   an application program, wherein the printer server executes the application program;
   program logic means executed in the computer system, including:
      (i) means for monitoring execution of a plurality of tasks in a computer system, wherein each executing task comprises an executing thread, wherein a thread is an instance of a print job being transmitted to the printer server from the computer system;
      (ii) means for determining progress status information for each of the executing tasks by:
         (a) maintaining an object for each executing task, wherein each object includes status information;
         (b) updating status information in the objects to indicate more recent status information on the executing tasks by:
            (I) executing, from each thread executing one task, a callback routine to communicate with an application program;
            (II) determining updated status information for the tasks associated with the thread executing the callback routine; and
            (III) means for updating the object associated with the thread executing the callback routine with the updated status information, wherein the thread executes the callback routine in the computer system to obtain status information for the print job associated with the thread executing the callback routine from the application program executing in the printer server;
         (c) updating progress status information displayed in the graphical representation with the updated status information;
      (iii) means for selecting one of the executing tasks; and
      (iv) means for displaying on a computer terminal a graphical representation of the progress status information of the selected executing task.

19. The system of claim 18, wherein a print job is comprised of at least one component print file, wherein the status information in each object includes a current file value indicating the current file being transmitted to the printer server, a total file value indicating all the files in the print job, and a file size value indicating a size of the current file being transmitted, wherein the program logic means executing in the computer system further comprises:
   means for calculating the total percent of print files in the print job transmitted to the printer server and the percent transmitted of the current file being transmitted;

means for displaying the total number of files in the print job;

means for displaying a percent of all files in the print job that have been transmitted;

means for displaying a number of the file being sent; and means for displaying a percent of the file being sent that has been transmitted.

20. An article of manufacture for use in programming a computer system to display a progress indicator on a display attached to the computer system, the article of manufacture comprising computer readable storage media accessible to the computer system, wherein the computer readable storage media has at least one computer program embedded therein that causes the computer system to perform the steps of:

monitoring execution of a plurality of tasks in the computer system;

determining progress status information for each of the executing tasks;

receiving user selection of one of the executing tasks; and displaying on a computer display a graphical representation of the progress status information of the selected executing task.

21. The article of manufacture of claim 20, wherein the executing tasks have a discrete beginning and end, and wherein the progress status information indicates an amount of the task that has completed.

22. The article of manufacture of claim 20, wherein the executing tasks are of the same class of tasks.

23. The article of manufacture of claim 20, wherein the executing tasks are print jobs being transmitted to a printer server and wherein the graphical representation of the progress status information indicates an amount of the selected print job that has completed.

24. The article of manufacture of claim 20, wherein the graphical representation is a dialog box and wherein the step of selecting one of the executing tasks comprises selecting the executing task from a list displayed from the dialog box.

25. The article of manufacture of claim 20, wherein the step of determining progress status information comprises the steps of:

maintaining an object for each executing task, wherein each object includes status information;

updating status information in the objects to indicate more recent status information on the executing tasks; and updating-progress status information displayed in the graphical representation with the updated status information.

26. The article of manufacture of claim 25, wherein each executing task comprises an executing thread, wherein the step of updating status information comprises the steps of:

executing, from each thread executing on task, a callback routine to communicate with an application program;

determining, with the callback routine, updated status information for the tasks associated with the thread executing the callback routine; and updating the object associated with the thread executing the callback routine with the updated status information.

27. An article of manufacture for use in programming a computer system to display a progress indicator on a display attached to the computer system, the article of manufacture comprising computer readable storage media accessible to the computer system, wherein the computer readable storage media has at least one computer program embedded therein that causes the computer system to perform the steps of:

(a) monitoring execution of a plurality of tasks in the computer system, wherein each executing task comprises an executing thread;

(b) determining progress status information for each of the executing tasks by:
 (i) maintaining an object for each executing task, wherein each object includes status information;
 (ii) updating status information in the objects to indicate more recent status information on the executing tasks by:
  (A) executing, from each thread executing one task, a callback routine to communicate with an application program;
  (B) determining, with the callback routine, updated status information for the tasks associated with the thread executing the callback routine; and
  (C) updating the object associated with the thread executing the callback routine with the updated status information; and
 (iii) updating progress status information displayed in the graphical representation with the updated status information, (c) selecting one of the executing tasks;

(d) displaying on a computer display a graphical representation of the progress status information of the selected executing task;

(e) maintaining a list of objects for executing threads, wherein each object includes a value indicating whether the thread corresponding to the object is active;

(f) processing the list of objects and the value in the objects indicating whether the thread is inactive to determine objects associated with inactive tasks; and (g) deleting from the list of objects those determined objects associated with inactive tasks.

28. The article of manufacture of claim 26, wherein a thread is an instance of a print job being transmitted to a printer server, wherein the application program is executing in the printer server, and wherein the thread executes the callback routine in a client computer in communication with the printer server.

29. The article of manufacture of claim 28, wherein a print job is comprised of at least one component print file, wherein the status information in each object includes a current file value indicating the current file being transmitted to the printer server, a total file value indicating all the files in the print job, and a file size value indicating a size of the current file being transmitted, further comprising the step of calculating a total percent of print files in the print job transmitted to the printer server and the percent transmitted of the current file being transmitted, and wherein the step of displaying progress status information comprises displaying at least one status information indicia that is a member of the set of status information indicia comprising: a total number of files in the print job; a percent of all files in the print job that have been transmitted; a number of the file being sent; and a percent of the file being sent that has been transmitted.

30. The article of manufacture of claim 29, wherein the step of displaying the percent of all files in the print job that have been transmitted comprises displaying the percent as a total percent of bytes across all files that have been transmitted.

31. A memory device storing data structures accessible to an application program, wherein the data structures comprise an object associated with each task executing in a computer system, wherein each object includes status information on the task associated with the object, wherein the application program updates status information in the objects to indicate more recent status information on the executing tasks, and wherein the application program updates progress status information displayed in a graphical representation of progress status information for at least one user selected executing task.

32. A memory device storing data structures accessible to a first application program, wherein the data structures comprise an object associated with each task executing in a computer system, wherein each executing task comprises an executing thread, wherein the first application program updates status information in the objects to indicate more recent status information on the executing tasks by executing a callback routine to communicate with a second application program to obtain updated status information, and wherein the first application program updates the object with the updated status information from the application program, and wherein the first application program updates progress status information displayed in a graphical representation of progress status information for at least one selected executing task.

33. The memory device of claim 32, further comprising a data structure indicating a list of the objects, wherein each object includes a field indicating whether the thread corresponding to the object is active, wherein the first application program processes the list of objects and the field in the objects indicating whether the thread is inactive to determine objects associated with inactive tasks, and wherein the application program deletes form the list of objects those determined objects associated with inactive tasks.

34. The memory device of claim 32, wherein a thread is an instance of a print job being transmitted to a printer server, wherein the second aplication program is executing in the printer server, wherein a print job is comprised of multiple component print file, and wherein each object further includes:

a current file field indicating a current file being transmitted to the printer server;

a total file field indicating all the files in the print job; and a file size field indicating a size of the current file being transmitted, wherein the first application program calculates a total percent of print files in the print job transmitted to the printer server and the percent transmitted of the current file beung transmitted, and wherein the application program displays in the graphical representation at least one status information indicia that is a memberof the set of status information indicia comprising a total number of files in the print job, a percent of all files in the print job that have been transmitted, a number of the file being sent, and a percent of the file being sent that has been transmitted.

* * * * *

UNITED STATES PATENT AND TRADEMARK OFFICE
CERTIFICATE OF CORRECTION

PATENT NO. : 6,639,687 B1
DATED : October 28, 2003
INVENTOR(S) : Robert Curt Nielsen It is certified that error appears in the above-identified patent and that said Letters Patent is hereby corrected as shown below:

Column 5,
Line 28, begin new paragraph.

Column 6,
Line 1, delete "15%;" and insert -- 15%. -- and begin new paragraph.

Column 15,
Line 29, delete "the" and insert -- a --.
Line 46, delete "updating-progress" and insert -- updating progress --.

Column 18,
Line 8, delete "file," and insert -- files, --.
Line 20, delete "membberof" and insert -- member of --.

Signed and Sealed this

Thirteenth Day of December, 2005

JON W. DUDAS
*Director of the United States Patent and Trademark Office*